United States Patent
Fukuda et al.

(10) Patent No.: US 12,312,424 B2
(45) Date of Patent: May 27, 2025

(54) POLYVINYL ALCOHOL-BASED RESIN, METHOD FOR PRODUCING POLYVINYL ALCOHOL-BASED RESIN, DISPERSING AGENT AND DISPERSING AGENT FOR SUSPENSION POLYMERIZATION

(71) Applicant: Mitsubishi Chemical Corporation, Tokyo (JP)

(72) Inventors: Junki Fukuda, Tokyo (JP); Yoshihito Yamauchi, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 824 days.

(21) Appl. No.: 17/467,619

(22) Filed: Sep. 7, 2021

(65) Prior Publication Data

US 2021/0395409 A1    Dec. 23, 2021

Related U.S. Application Data

(63) Continuation of application No. PCT/JP2020/009519, filed on Mar. 5, 2020.

(30) Foreign Application Priority Data

Mar. 8, 2019  (JP) ................. 2019-043117

(51) Int. Cl.
  *C08F 116/06*    (2006.01)
  *C08F 2/20*      (2006.01)

(52) U.S. Cl.
  CPC .............. *C08F 116/06* (2013.01); *C08F 2/20* (2013.01)

(58) Field of Classification Search
  CPC ........ C08F 116/06; C08F 216/06; C08F 8/12; C08F 218/08
  See application file for complete search history.

(56) References Cited

U.S. PATENT DOCUMENTS

| | | | | |
|---|---|---|---|---|
| 3,161,621 A | * | 12/1964 | Arquette | ................ C08F 16/12 525/62 |
| 2004/0152834 A1 | | 8/2004 | Kato et al. | |
| 2004/0186232 A1 | | 9/2004 | Shibutani | |
| 2006/0180956 A1 | | 8/2006 | Kato et al. | |
| 2009/0253880 A1 | | 10/2009 | Shibutani et al. | |
| 2016/0347883 A1 | * | 12/2016 | Kumaki | ................ C08F 114/06 |
| 2017/0008988 A1 | * | 1/2017 | Kusudou | ................... C08F 8/12 |
| 2017/0335030 A1 | * | 11/2017 | Fukuhara | .............. C08F 116/06 |
| 2018/0044451 A1 | | 2/2018 | Phung et al. | |
| 2019/0119414 A1 | | 4/2019 | Takayama et al. | |
| 2020/0078754 A1 | | 3/2020 | Muramatsu et al. | |

FOREIGN PATENT DOCUMENTS

| | | |
|---|---|---|
| CN | 1506383 A | 6/2004 |
| CN | 1519271 A | 8/2004 |
| CN | 101506255 A | 8/2009 |
| CN | 107548404 A | 1/2018 |
| CN | 109071716 A | 12/2018 |
| JP | H08-269112 A | 10/1996 |
| JP | H08-283313 A | 10/1996 |
| JP | 2004-250695 A | 9/2004 |
| WO | 2018/117245 A1 | 6/2018 |
| WO | 2018/212207 A1 | 11/2018 |

OTHER PUBLICATIONS

Notice of Reasons for Refusal issued in JP Patent Application No. 2021-505002, May 16, 2023, translation.
Extended European Search Report issued in European Patent Application No. 20770929.6, Apr. 5, 2022.
Office Action issued in European Patent Application No. 20770929.6, Apr. 12, 2023.
ISR issued in WIPO Patent Application No. PCT/JP2020/009519, May 19, 2020, English translation.
Written Opinion issued in WIPO Patent App. No. PCT/JP2020/009519, May 19, 2020, English translation.
IPRP issued in WIPO Patent Application No. PCT/JP2020/009519, Aug. 25, 2021, English translation.
Office Action issued in CN Patent Application No. 202080018972.7, Oct. 18, 2023, translation.
Office Action issued in CN Patent Application No. 202080018972.7, Jun. 1, 2024, translation.
Office Action issued in EP Patent Application No. 20770929.6, issued Aug. 19, 2024.
Decision of Refusal issued in Chinese Patent Application No. 202080018972.7, issued Oct. 17, 2024, translation.

* cited by examiner

*Primary Examiner* — Michael M Dollinger
(74) *Attorney, Agent, or Firm* — GREENBLUM & BERNSTEIN P.L.C.

(57) ABSTRACT

The present invention relates to a polyvinyl alcohol-based resin, wherein when the polyvinyl alcohol-based resin is made into a 0.1 wt % aqueous solution, an absorbance (X) at a wavelength of 320 nm in an ultraviolet absorption spectrum thereof is 0.3 or more, and a ratio (Y/X) of an absorbance (Y) at a wavelength of 380 nm to the absorbance (X) at a wavelength of 320 nm is 0.09 or more.

4 Claims, No Drawings

POLYVINYL ALCOHOL-BASED RESIN, METHOD FOR PRODUCING POLYVINYL ALCOHOL-BASED RESIN, DISPERSING AGENT AND DISPERSING AGENT FOR SUSPENSION POLYMERIZATION

CLAIM FOR PRIORITY

This application is a Continuation of PCT/JP2020/009519 filed Mar. 5, 2020, and claims the priority benefit of Japanese application 2019-043117 filed Mar. 8, 2019, the contents of which are expressly incorporated by reference herein in their entireties.

TECHNICAL FIELD

The present invention relates to a polyvinyl alcohol-based resin, more specifically to a polyvinyl alcohol-based resin suitable as a dispersing agent in suspension polymerization of a vinyl-based compound during the production of polyvinyl chloride, a method for producing the polyvinyl alcohol-based resin, a dispersing agent, and a dispersing agent for suspension polymerization.

BACKGROUND ART

A polyvinyl alcohol-based resin (hereinafter, "polyvinyl alcohol" may be abbreviated as "PVA") is obtained by saponifying a polymer obtained by polymerizing a vinyl ester-based monomer such as vinyl acetate. The PVA-based resin has a vinyl alcohol structural unit corresponding to a degree of saponification and a vinyl ester structural unit remaining without saponification.

Further, the PVA-based resin has a structure that is dehydrated by a heat treatment and then has a double bond in the main chain. The PVA-based resin having such a structure is used for dispersion stabilizers for suspension, water retention materials, and the like during the production of polyvinyl chloride. In addition, it is also known that the strength can be improved by subjecting a film or fiber made of a PVA-based resin to a heat treatment.

On the other hand, various heat-treated PVA-based resins have been studied as dispersing agents for suspension polymerization in the production of polyvinyl chloride. For example, a polyvinyl alcohol-based resin having a carbonyl group in the molecule and containing a salt or a hydroxide of a divalent or trivalent metal has been proposed (see, for example, PTL 1).

In addition, a PVA-based polymer has been proposed, in which an absorbance (a) at 280 nm according to an ultraviolet absorption spectrum of an aqueous solution having a concentration of 0.1 wt % is larger than 0.1, an absorbance (b) at 320 nm according to the ultraviolet absorption spectrum of the aqueous solution is 0.03 or more, absorbance (b)/absorbance (a) is less than 0.3, and a block character of residual acetic acid groups is 0.4 or more (see, for example, PTL 2).

The absorbance (peak) of the ultraviolet absorption spectrum of the 0.1 wt % aqueous solution is caused by the double bond in the PVA-based resin. The peak near the wavelength of 215 nm belongs to the [—CO—CH=CH—] structure, the peak near the wavelength of 280 nm belongs to the [—CO—(CH=CH)$_2$-] structure, and the peak near the wavelength of 320 nm belongs to the [—CO—(CH=CH)$_3$-] structure. In addition, it is presumed that the peak near the wavelength of 380 nm belongs to the structure of [—CO—(CH=CH)$_4$-] in the PVA-based resin.

Since the double bond in the PVA-based resin acts as a starting point of the polymerization reaction during suspension polymerization of the vinyl chloride monomer, it is generally known that the more the double bond is, the better the polymerization stability is.

However, in order to obtain a PVA-based resin having a double bond, as described in PTLs 1 and 2, it is necessary to perform a heat treatment at about 150° C. for 5 to 6 hours, which causes a problem that the production cost is high. In addition, when there are many opportunities to come into contact with oxygen in the production process, there is a possibility that the amount of insoluble matters when the obtained PVA-based resin is made into an aqueous solution increases, and there is also a problem that the randomness of residual fatty acid ester groups such as acetoxy groups does not increase.

In order to solve the above problems, it has been proposed to perform a heat treatment using a twin-screw extruder (for example, PTL 3). The PVA-based resin described in PTL 3 is a polyvinyl alcohol-based resin having a carbonyl group in the molecule and having a block character of a residual fatty acid ester group of 0.5 or more, and each absorbance at 215 nm, 280 nm, and 320 nm according to the ultraviolet absorption spectrum of a 0.1 wt % aqueous solution of the polyvinyl alcohol resin is 0.1 or more, and the ratio of the absorbance at 320 nm/absorbance at 280 nm is 0.3 or more.

CITATION LIST

Patent Literature

PTL 1: JP-A-H08-269112
PTL 2: JP-A-H08-283313
PTL 3: JP-A-2004-250695

SUMMARY OF INVENTION

Technical Problem

However, when the conventional PVA-based resin is used as a dispersing agent for suspension polymerization during the production of a suspension-polymerized product (for example, polyvinyl chloride), the content of the [—CO—(CH=CH)$_4$-] structure (which belongs to a peak near a wavelength of 380 nm) in the PVA-based resin is not sufficient, the double bond that is the starting point of the polymerization reaction is insufficient, and the polymerization stability of suspension polymerization remains a problem.

Therefore, an object of the present invention is to provide a PVA-based resin having a high content of a [—CO—(CH=CH)$_4$-] structure, which is expected to enhance the polymerization stability of a suspension-polymerized product (for example, polyvinyl chloride) during polymerization, a method for producing the PVA-based resin, a dispersing agent using the PVA-based resin, and a dispersing agent for suspension polymerization for use in the production of polyvinyl chloride.

Solution to Problem

As a result of diligent studies to solve the above problems, the present inventors have found that when the content of the carbonyl group in the PVA-based resin before a heat treatment is increased, a PVA-based resin having a high content of a [—CO—(CH=CH)$_4$-] structure in the resin can be obtained after the heat treatment. Thus, the present invention has been completed.

That is, the present invention is characterized in the following (1) to (6).

(1) A polyvinyl alcohol-based resin, wherein when the polyvinyl alcohol-based resin is made into a 0.1 wt % aqueous solution, an absorbance (X) at a wavelength of 320 nm in an ultraviolet absorption spectrum thereof is 0.3 or more, and a ratio (Y/X) of an absorbance (Y) at a wavelength of 380 nm to the absorbance (X) at a wavelength of 320 nm is 0.09 or more.

(2) The polyvinyl alcohol-based resin according to (1), wherein the polyvinyl alcohol-based resin has a degree of saponification of 60 mol % or more.

(3) A method for producing a polyvinyl alcohol-based resin, including: polymerizing a monomer containing a vinyl ester-based monomer; saponifying the obtained polymer; and subjecting the saponified polymer to a heat treatment.

(4) The method for producing a polyvinyl alcohol-based resin according to (3), wherein a content of a carbonyl group in the saponified polymer is 0.03 mol % or more.

(5) A dispersing agent containing: the polyvinyl alcohol-based resin according to (1) or (2).

(6) A dispersing agent for suspension polymerization containing: the polyvinyl alcohol-based resin according to (1) or (2).

Advantageous Effects of Invention

It is presumed that since the PVA-based resin of the present invention contains a high content of a [—CO—(CH=CH)$_4$-] structure in the resin, when such a PVA-based resin is used as a dispersing agent for suspension polymerization, the polymerization stability of a suspension-polymerized product (for example, polyvinyl chloride) can be improved.

DESCRIPTION OF EMBODIMENTS

Hereinafter, the polyvinyl alcohol-based resin of the present invention will be described in detail, but these show examples of desirable embodiments, and the present invention is not specified in these contents.

[Polyvinyl Alcohol-Based Resin]

The polyvinyl alcohol-based resin (hereinafter referred to as PVA-based resin) of the present invention is a PVA-based resin subjected to a heat treatment, and when the polyvinyl alcohol-based resin is made into a 0.1 wt % aqueous solution, an absorbance (X) at a wavelength of 320 nm in an ultraviolet absorption spectrum thereof is 0.3 or more, and a ratio (Y/X) of an absorbance (Y) at a wavelength of 380 nm to the absorbance (X) at a wavelength of 320 nm is 0.09 or more.

With respect to the PVA-based resin of the present invention, when the content of the carbonyl group in the PVA-based resin before a heat treatment is increased, the [—CO—(CH=CH)$_4$-] structure in the PVA-based resin after the heat treatment can be increased. Accordingly, a PVA-based resin that is presumed to have excellent polymerization stability during polymerization of a suspension-polymerized product (for example, polyvinyl chloride) can be obtained.

When the PVA-based resin of the present invention is made into a 0.1 wt % aqueous solution, the absorbance (X) at a wavelength of 320 nm in the ultraviolet absorption spectrum is 0.3 or more. When the ultraviolet absorbance of the 0.1 wt % aqueous solution of the PVA-based resin at a wavelength of 320 nm is too small, the formation amount of the double bond is small, and thus the surface activity tends to decrease. The ultraviolet absorbance of the 0.1 wt % aqueous solution of the PVA-based resin at a wavelength of 320 nm is preferably 0.35 or more. The upper limit of such an absorbance is not particularly limited, and is about 1.5 from the viewpoint of manufacturability.

In addition, the ultraviolet absorbance at wavelengths other than the wavelength of 320 nm is preferably as follows. Specifically, the ultraviolet absorbance at a wavelength of 215 nm is preferably 0.1 or more, more preferably 0.3 or more, and the upper limit is about 2. The ultraviolet absorbance at a wavelength of 280 am is preferably 0.1 or more, more preferably 0.3 or more, and the upper limit is about 2. When these absorbances are too low, the formation amount of the double bond is small, and thus the surface activity tends to decrease. In addition, when these absorbances are too high, the manufacturability tends to decrease.

In the ultraviolet absorption spectrum, the absorption at a wavelength of 215 nm belongs to the [—CO—CH=CH—] structure in the PVA-based resin, the absorption at a wavelength of 280 nm belongs to the [—CO—(CH=CH)$_2$-] structure in the PVA-based resin, and the absorption at a wavelength of 320 nm belongs to the [—CO—(CH=CH)$_3$-] structure in the PVA-based resin.

In addition, in the present invention, when the PVA-based resin of the present invention is made into a 0.1 wt % aqueous solution, the ratio (Y/X) of the absorbance (Y) at a wavelength of 380 nm to the absorbance (X) at a wavelength of 320 nm in the ultraviolet absorption spectrum is 0.09 or more, and preferably 0.10 or more. It is presumed that the absorption at a wavelength of 380 nm belongs to the [—CO—(CH=CH)$_4$-] structure in the PVA-based resin. When the absorbance ratio is too small, the surface activity tends to be low and the suspension polymerization stability tends to be low when the polyvinyl alcohol-based resin is used as a dispersing agent for suspension polymerization for vinyl chloride. The upper limit of the absorbance ratio is not particularly limited, and is about 3 from the viewpoint of productivity.

Such an absorbance can be obtained by measuring the absorbance of the 0.1 wt % aqueous solution of the PVA-based resin at wavelengths of 215 nm, 280 nm, 320 nm, and 380 nm using an ultraviolet-visible near-infrared spectrophotometer (for example, "V-560" (trade name) manufactured by JASCO Corporation). The absorbance is measured using a sample container (cell) having an optical path length of 1 cm.

Generally, the PVA-based resin is a resin obtained by saponifying a vinyl ester homopolymer or a copolymer of a vinyl ester and another monomer using an alkali catalyst or the like. The PVA-based resin of the present invention is obtained by subjecting, to a heat treatment, the PVA-based resin (PVA-based resin before a heat treatment) obtained by this saponification to cause a dehydration or deacetic acid reaction.

The degree of saponification (measured in accordance with JIS K 6726: 1994) of the PVA-based resin of the present invention is preferably 60 mol % or more, more preferably 65 mol % or more, still more preferably 67 mol % or more, and particularly preferably 69 mol % or more. The degree of saponification is preferably 98 mol % or less, more preferably 90 mol % or less, and still more preferably 88 mol % or less. Because of having an acetic acid group (hydrophobic group) in addition to a hydroxy group (hydrophilic group) in the molecule, the PVA-based resin of the present invention has surface activity and can be uniformly dispersed in a dispersion medium. When the degree of saponification is too low, the water dispersibility tends to decrease. Therefore, the degree of saponification is preferably 60 mol % or more. The PVA-based resin of the present invention is obtained by subjecting, to a heat treatment, a PVA-based resin obtained by saponification, but the degree of saponification of the PVA-based resin obtained by saponification and the degree of saponification of the PVA-based resin after the heat treatment are substantially the same.

The average polymerization degree of the PVA-based resin of the present invention is preferably 100 or more, more preferably 200 or more, and still more preferably 300 or more. In addition, the average polymerization degree is preferably 4000 or less, more preferably 3000 or less, and still more preferably 1000 or less. When the average polymerization degree is too low, the surface activity tends to be low, and when the PVA-based resin is used as a dispersing agent for suspension polymerization for vinyl chloride, aggregation is likely to occur during suspension polymerization. On the other hand, when the average polymerization degree is too high, the viscosity of the aqueous solution of the PVA-based resin tends to increase, and the handleability tends to decrease. The average polymerization degree can be measured in accordance with JIS K 6726:1994. The PVA-based resin of the present invention is obtained by subjecting, to a heat treatment, a PVA-based resin obtained by saponification, but the average polymerization degree of the PVA-based resin obtained by saponification and the average polymerization degree of the PVA-based resin after the heat treatment are substantially the same.

[Method for Producing Polyvinyl Alcohol-Based Resin]

As described above, when the PVA-based resin of the present invention is made into a 0.1 wt % aqueous solution, the ratio (Y/X) of the absorbance (Y) at a wavelength of 380 nm to the absorbance (X) at a wavelength of 320 nm in the ultraviolet absorption spectrum is 0.09 or more. In order to make the ratio (Y/X) of the absorbance (Y) at a wavelength of 380 nm to the absorbance (X) at a wavelength of 320 nm to be 0.09 or more, for example, a method of using a PVA-based resin having more carbonyl groups in the molecule, further subjecting the PVA-based resin to a heat treatment, causing a dehydration or deacetic acid reaction, and introducing a conjugated double bond can be mentioned.

First, a method of introducing more carbonyl groups into the molecule of the PVA-based resin will be described. Examples of such a method include the following methods (i) to (iv).

(i) In a method of polymerizing a monomer composition containing a vinyl ester based monomer, saponifying the obtained polymer, and oxidizing the obtained PVA-based resin with an oxidizing agent such as hydrogen peroxide, a method of oxidization with a larger amount of oxidizing agent (ii) In a method of saponifying, when polymerizing a monomer composition containing a vinyl ester-based monomer, the obtained polymer by polymerizing in the coexistence of a chain transfer agent containing a carbonyl group such as aldehydes and ketones, a method using a larger amount of chain transfer agent (iii) In a method of polymerizing a monomer composition containing a vinyl ester-based monomer in the coexistence of 1-methoxy-vinyl acetate or the like and saponifying the obtained polymer, a method using a larger amount of 1-methoxy-vinyl acetate or the like (iv) In a method of saponifying, when polymerizing a monomer composition containing a vinyl ester-based monomer, the obtained polymer by blowing air, a method of blowing a larger amount of air Among the above methods, the above method (ii) is industrially preferred from the viewpoint of easy solvent recovery.

Hereinafter, the method for producing the PVA-based resin of the present invention will be described by taking the method (ii) above as an example. In the method (ii), the PVA-based resin of the present invention is obtained by the method shown by the following scheme. In the scheme, Ac represents an acetyl group.

[Chem. 1]

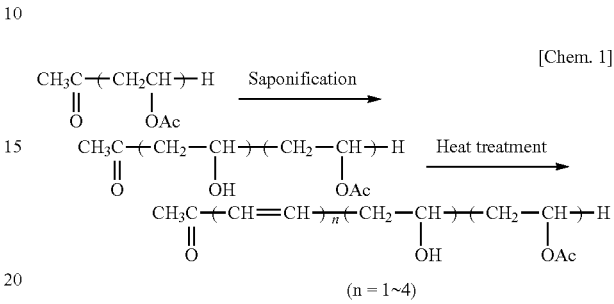

Examples of the vinyl ester-based monomer as a starting material include vinyl formate, vinyl acetate, vinyl propionate, vinyl butyrate, vinyl caprate, vinyl laurate, vinyl palmitate, vinyl stearate, and other linear or branched saturated fatty acid vinyl esters. From the viewpoint of practice, as the vinyl ester-based monomer, vinyl acetate is preferably used, and vinyl acetate alone or a combination of vinyl acetate and a fatty acid vinyl ester compound other than vinyl acetate is more preferably used.

There are no particular restrictions on the polymerization of the monomer composition, and a known polymerization method can be optionally used. For example, solution polymerization is carried out using an alcohol having 1 to 3 carbon atoms as a solvent, such as methanol, ethanol or isopropyl alcohol. Of course, bulk polymerization, emulsion polymerization, and suspension polymerization can also be used. In such solution polymerization, any means such as split charging and batch charging may be used as the method for charging the vinyl ester-based monomer. The polymerization reaction is carried out using known radical polymerization catalysts such as azobisisobutyronitrile, acetyl peroxide, benzoyl peroxide, lauroyl peroxide, azobisdimethylvaleronitrile and azobismethoxyvaleronitrile. The polymerization reaction temperature is selected from the range of about 40° C. to the boiling point.

Examples of the chain transfer agent for use in the method (ii) include aldehydes such as acetaldehyde, propionaldehyde, butyraldehyde, and benzaldehyde. Examples of the chain transfer agent for use in the method (ii) include ketones such as acetone, methyl ethyl ketone, hexanone, and cyclohexanone. The above may be used alone or in combination of two or more thereof.

Among the above chain transfer agents, aldehydes are preferably used, and acetaldehyde is more preferred, in that the structure after polymerization is similar to that of the final product.

The amount of the chain transfer agent added varies slightly depending on the chain transfer constant of the chain transfer agent to be added, the polymerization degree of the target PVA-based resin, and the like. The amount of the chain transfer agent added is, for example, preferably 0.1 wt % or more, more preferably 0.5 wt % or more, still more preferably 1.0 wt % or more, and particularly preferably 1.3 wt % or more, with respect to the vinyl ester-based monomer. In addition, the amount of the chain transfer agent added is preferably 5 wt % or less, more preferably 3 wt % or less, still more preferably 2.5 wt % or less, and particularly preferably 2 wt % or less. The chain transfer agent may be charged at the initial batch or at the time of the polymerization reaction. By charging the chain transfer agent by any method, the molecular weight distribution of the PVA-based resin can be controlled.

The vinyl ester-based monomer may be used alone, but if necessary, a modified PVA-based resin can also be obtained by copolymerizing using a monomer polymerizable with the vinyl ester-based monomer. Examples of such a monomer include: monomers having a vinyl group and an epoxy group, such as glycidyl (meth)acrylate, glycidyl (meth)allyl ether, 3,4-epoxycyclohexyl (meth)acrylate, and allyl glycidyl ether, monomers having 2 or more allyl groups, such as triallyloxyethylene, diallyl maleate, triallyl cyanurate, triallyl isocyanurate, tetraallyloxyethane, and diallyl phthalate; allyl ester monomers such as allyl acetate, vinyl acetoacetic ester, acetoacetic acid allyl ester, and diacetoacetic acid allyl ester; acetoacetoxyalkyl (meth)acrylates such as acetoacetoxyethyl (meth)acrylate and acetoacetoxypropyl (meth)acrylate; acetacetoxyalkyl crotonates such as acetoacetoxyethyl crotonate and acetoacetoxypropyl crotonate; 2-cyanoacetoacetoxyethyl (meth)acrylate; divinylbenzene; alkylene glycol (meth)acrylates such as ethylene glycol di(meth)acrylate, 1,2-propylene glycol di(meth)acrylate, 1,3-propylene glycol di(meth)acrylate, 1,4-butanediol di(meth)acrylate, 1,6-hexanediol di(meth)acrylate, and neopentyl glycol di(meth)acrylate; trimethylolpropane tri(meth) acrylate; allyl (meth)acrylate; hydroxyalkyl (meth)acrylates (the alkyl moiety is a C1-C10 alkyl group, preferably a C1-C6 alkyl group) such as 2-hydroxyethyl (meth)acrylate, hydroxypropyl (meth)acrylate, and 4-hydroxybutyl (meth) acrylate; nitrile-based monomers such as (meta)acrylonitrile; styrene-based monomers such as styrene and α-methylstyrene; olefin such as ethylene, propylene, 1-butene, and isobutene; halogenated olefins such as vinyl chloride, vinylidene chloride, vinyl fluoride, and vinylidene fluoride; olefin-based monomers such as ethylene sulfonic acid; diene-based monomers such as butadiene-1,3, 2-methylbutadiene, 1,3 or 2,3-dimethylbutadiene-1,3, 2-chlorobutadiene-1,3; hydroxy group-containing α-olefins such as 3-butene-1-ol, 4-pentene-1-ol, 5-hexene-1,2-diol, and glycerin monoallyl ether, and derivatives such as acylated products thereof; hydroxymethylvinylidene diacetates such as 1,3-diacetoxy-2-methylenepropane, 1,3-dipropionyloxy-2-methylenepropane, and 1,3-dibutyronyloxy-2-methylenepropane; unsaturated acids such as itaconic acid, maleic acid, acrylic acid, and salts or mono or dialkyl esters thereof; nitriles such as acrylonitrile; amides such as methacrylamide and diacetone acrylamide; compounds such as olefin sulfonic acid such as ethylene sulfonic acid, allyl sulfonic acid, methallyl sulfonic acid, 2-acrylamide-2-methylpropane sulfonic acid (AMPS) or salts thereof; vinyl alkyl dialkoxysilanes such as vinyltriethoxysilane, vinyltrimethoxysilane, vinyltripropoxysilane, vinyltributoxysilane, vinylmethyldimethoxysilane, and vinylmethyldiethoxysilane; γ-(meth) acryloxypmpyltrialkoxysilanes such as γ-(meth)acryloxypropyltrimethoxysilane and γ-(meth) acryloxypropyltriethoxysilane; γ-(meth) acryloxypropylalkyldialkoxysilanes such as γ-(meth) acryloxypropylmethyldimethoxysilane and γ-(meth) acryloxypropylmethyldiethoxysilane; vinyltris(β-methoxyethoxy)silane; and hydroxymethylvinylidene diacetate. Specific example of the hydroxymethylvinylidene diacetate include 1,3-diacetoxy-2-methylenepropane, 1,3-dipropionyloxy-2-methylenepropane, and 1,3-dibutyronyloxy-2-methylenepropane.

In addition, examples thereof include diol-containing compounds such as 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, 5,6-diacyloxy-1-hexene, glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinyl ethylene carbonate, and 2,2-dimethyl-4-vinyl-1,3-dioxolane. These monomers may be used alone or in combination of two or more thereof.

The term "(meta)acrylate" means "acrylate and/or methacrylate", and the same applies to "(meth)allyl" and "(meth) acrylo".

The content of the monomer polymerizable with the vinyl ester-based monomer is preferably 20 mol % or less, and more preferably 10 mol % or less in the monomer composition.

The vinyl ester-based polymer obtained by the above polymerization is saponified and a carbonyl group is introduced into the molecule.

Saponification can be carried out by a known method, for example, the vinyl ester-based polymer is dissolved in an alcohol and saponification is carried out in the presence of an alkali catalyst or an acid catalyst. Examples of the alcohol include alcohols having 1 to 6 carbon atoms such as methanol, ethanol and butanol.

The concentration of the vinyl ester-based polymer in the alcohol is selected from the range of 20 wt % to 50 wt % from the viewpoint of solubility.

As the alkali catalyst, for example, hydroxides of alkali metals such as sodium hydroxide, potassium hydroxide, sodium methylate, sodium ethylate, and potassium methylate, and alkaline catalysts such as alcoholate can be used. As the acid catalyst, for example, an aqueous solution of an inorganic acid such as hydrochloric acid or sulfuric acid, or an organic acid such as p-toluenesulfonic acid can be used. The amount of such a catalyst used is preferably 1 to 100 mmol equivalent, more preferably 1 to 40 mmol equivalent, and still more preferably 1 to 20 mmol equivalent with respect to the vinyl ester-based monomer. When the amount of the catalyst used is too small, it tends to be difficult to proceed with saponification to the desired degree of saponification. Further, even if the amount of the catalyst used is too large, it is difficult to see an improvement in the reactivity of saponification, which is not preferred.

The reaction temperature at the time of saponification is not particularly limited, and is preferably, for example, 10° C. to 70° C., and more preferably 20° C. to 50° C.

The reaction time for saponification may be appropriately adjusted according to the saponification treatment method. For example, when the saponification is carried out by batch saponification, the saponification reaction is preferably carried out over 2 to 3 hours.

In the present invention, a modified PVA-based resin may be produced by post-modifying the saponified polymer (PVA-based resin). Examples of a method of producing the modified PVA-based resin include a method of acetoacetic esterification, acetalization, urethanization, etherification, grafting, phosphate esterification, and oxyalkylenation of a PVA-based resin obtained by saponification.

As described above, the PVA-based resin obtained by saponification is then subjected to a heat treatment, and such a PVA-based resin obtained by saponification contains at least one of a salt and a hydroxide of a divalent or trivalent metal. When at least one of a salt and a hydroxide of a divalent or trivalent metal is contained, the heat treatment can be performed efficiently.

Examples of the divalent to trivalent metal include magnesium, calcium, zinc, and aluminum. Specific examples of the salt and the hydroxide of these metals include magnesium acetate tetrahydrate, calcium acetate, calcium propionate, magnesium butyrate, magnesium carbonate, magnesium hydroxide, zinc acetate, and aluminum hydroxide. The above may be used alone or in combination of two or more thereof. Among these, magnesium acetate tetrahydrate and calcium acetate are preferred because of being soluble in water and/or methanol and being easy to handle industrially.

The content of the salt and/or the hydroxide of the divalent or trivalent metal in the PVA-based resin of the present invention is preferably 30 µmol/g or more, and more preferably 40 µmol/g or more, with respect to the PVA-based resin. In addition, the content is preferably 300 µmol/g or less, and more preferably 200 µmol/g or less. When the content is too small, the amount of the vinylene group produced tends to decrease. On the other hand, when the content is too large, the PVA-based resin tends to be colored or decomposed.

The method of containing the salt and/or the hydroxide of the divalent or trivalent metal is not limited. The above compound may be added directly to a paste before saponification, a slurry after saponification, or the like. The above compound is preferably dissolved in alcohol such as methanol, ethanol, propanol, or water in the form of a solution having a concentration of about 3 wt % to 15 wt %, added to the PVA slurry after saponification, and distributed to the PVA-based resin.

By subjecting the obtained PVA-based resin to a heat treatment, a dehydration or deacetic acid reaction occurs, a conjugated double bond is generated, and the PVA-based resin of the present invention is obtained.

The heat treatment may be performed using any device. For example, the heat treatment can be carried out by using a stirring device that stirs the contents while heating such as a Nauta mixer and a conical dryer or an extruder such as a single-screw extruder and a twin-screw extruder. Among these, it is preferable to perform the heat treatment using an extruder because continuous production is possible.

The heat treatment can be performed by supplying the PVA-based resin to the extruder. In such a heat treatment, the temperature of the PVA-based resin is preferably 175° C. or higher, and more preferably 200° C. or higher. In addition, the temperature is preferably 260° C. or lower, and more preferably 250° C. or lower. When the temperature of the PVA-based resin is 175° C. or higher, the efficiency of introducing the conjugated double bond tends to improve. When the temperature is 260° C. or lower, decomposition of the PVA-based resin is less likely to occur, and decomposition products of the PVA-based resin that cause gel formation are less likely to occur, and as a result, it is possible to prevent the formation of foreign substances such as char in the PVA-based resin. The staying time (melt heat treatment time) in the extruder is preferably 30 seconds to 15 minutes, and more preferably 30 seconds to 10 minutes. When the staying time is 30 second or longer, the efficiency of introducing the conjugated double bond tends to improve, and when the staying time is shorter than 15 minutes, it is possible to prevent the formation of foreign substances such as char in the PVA-based resin.

In such a heat treatment, in order to generate a sufficient amount of vinylene groups to obtain good surface activity, the content of the carbonyl group of the PVA-based resin before the heat treatment is preferably 0.03 mol % or more, more preferably 0.05 mol % or more, still more preferably 0.1 mol % or more, and particularly preferably 0.17 mol % or more. In addition, the content is preferably 2.5 mol % or less, more preferably 2 mol % or less, still more preferably 1.5 mol % or less, and particularly preferably 1.0 mol % or less.

The content of the carbonyl group (carbonyl group amount) can be measured as follows.

That is, the PVA-based resin whose carbonyl group amount is to be measured is completely saponified by a known method, 0.5 g of the fully saponified PVA-based resin is weighed in a 100 mL Erlenmeyer flask, and 15 mL of a Walpole's buffer (N/50 hydrochloric acid-sodium acetate, pH 5.2) is added to dissolve the PVA-based resin. Further, 6 mL of a p-nitrophenylhydrazine solution (p-nitrophenylhydrazine 0.82 g/100 mL methanol) is added and left at room temperature for 2 days, and then poured into methanol to precipitate the PVA-based resin. The precipitated PVA-based resin is filtered, washed with Soxhlet using methanol for 7 hours, dried at 110° C. for 3 hours, 0.2 g of the PVA-based resin is separated and dissolved in 50 mL of water to calculate the concentration. The carbonyl group amount is calculated from the absorbance at 450 nm in the ultraviolet absorption spectrum when this solution is diluted to a 0.1 wt % aqueous solution. As a calibration curve of the carbonyl group amount, it is known that the carbonyl group amount=$0.21 \times E_{405}$ ($g^{-1}|cm^{-1}$). $E_{405}$ is the absorbance at a wavelength of 405 nm. (See Kiyokazu lmai, Yujiro Kazusa, Polymer Chemistry, Vol. 15, No. 156, pp. 249-254 (1958).)

[Use]

Since the PVA-based resin of the present invention obtained as described above is prevented in coloring, it has an excellent hue and can be suitably used for various uses. Uses of the PVA-based resin of the present invention include, for example, the following.

(1) Molded product-related: fibers, films, sheets, pipes, tubes, leak-proof films, provisional films, for chemical lace, water-soluble fibers, etc.

(2) Adhesive-related: adhesives for wood, paper, aluminum foil, and plastics, adhesives, re-wetting agents, binders for non-woven fabrics, binders for various building materials such as gypsum board and fiber board, binders for various powder granulation, additives for cement and mortar, hot melt adhesives, pressure sensitive adhesives, adhesives for anionic paints, etc.

(3) Coating agent-related: clear paper coating agents, paper pigment coating agents, paper internal sizing agents, textile sizing agents, warp glue, fiber processing agents, leather finish, paints, anti-fogging agents, metal corrosion inhibitors, galvanizing brighteners, antistatic agents, conductive agents, provisional paints, etc.

(4) Blending agents for hydrophobic resins-related: antistatic agents for hydrophobic resins and hydrophilicity-imparting agents; additives for composite fibers, films and other molded articles; etc.

(5) Dispersing agent-related: dispersing agents for color developer of coating liquid for heat-sensitive color-developing layer, pigment dispersion stabilizer for paints, India inks, water-based colors, adhesives, etc.; dispersion stabilizer for suspension polymerization of various vinyl compounds such as vinyl chloride, vinylidene chloride, styrene, (meth) acrylate, and vinyl acetate; etc.

(6) Emulsification dispersion stabilizer-related: emulsifiers for emulsion polymerization of various acrylic monomers, ethylenically unsaturated compounds, and butadiene compounds; post-emulsifiers of hydrophobic resins such as polyolefins and polyester resins, epoxy resins, paraffins, bitumen; etc.

(7) Thickener-related: thickeners for various aqueous solutions, emulsions and petroleum drilling fluids, etc.

(8) Coagulant-related: coagulant for suspensions and dissolved substances in water, drainage agent for pulp, slurry, etc.

(9) Exchange resin or the like-related: ion exchange resin, chelate exchange resin, ion exchange membrane, etc.

(10) Others: soil conditioners, photosensitive agents, photosensitive resist resins, etc.

Among the above, in particular, the PVA-based resin of the present invention is useful as a dispersion stabilizer for suspension polymerization of various vinyl compounds such as vinyl acetate and vinyl chloride, and is particularly useful as a dispersion stabilizer for suspension polymerization of vinyl chloride compounds.

[Dispersing Agent]

When the PVA-based resin of the present invention is used as a dispersing agent, examples of the objects to be dispersed include polymerizable monomers and powders. In particular, the PVA-based resin of the present invention preferably disperses a polymerizable monomer and is used as a dispersing agent for suspension polymerization.

Examples of the polymerizable monomer as a target of suspension polymerization include vinyl chloride, vinylidene halide, vinyl ether, vinyl acetate, vinyl benzoate, acrylic acid, methacrylic acid, maleic acid or an anhydride thereof, ethylene, propylene, and styrene. Among these, the PVA-based resin of the present invention is suitably used for homopolymerization of vinyl chloride or copolymerization of vinyl chloride with a copolymerizable monomer.

[Dispersing Agent for Suspension Polymerization]

The case where the PVA-based resin of the present invention is used as a dispersing agent for suspension polymerization will be described in detail below.

The amount of the PVA-based resin of the present invention used may be appropriately adjusted according to the monomer to be subjected to suspension polymerization. For example, when used for suspension polymerization of a vinyl chloride-based monomer, the amount of the PVA-based resin of the present invention used is preferably used in an amount of 5 parts by weight or less, more preferably 0.01 to 1 part by weight, and still more preferably 0.02 to 0.2 parts by weight, with respect to 100 parts by weight of the vinyl chloride-based monomer. When the amount used is too large, the amount of the PVA-based resin that does not act as a dispersing agent tends to increase.

During suspension polymerization, for example, the polymerization can be carried out in the presence of an oil-soluble catalyst, by adding the PVA-based resin of the present invention to water or a heated water medium as a dispersing agent, and dispensing the vinyl chloride-based monomer.

Examples of the method of adding the PVA-based resin include a method of adding a PVA-based resin as a powder, a method of adding a PVA-based resin in the form of a solution in which a PVA-based resin is dissolved into water, an organic solvent such as alcohol, ketone, and ester, or a mixed solvent of these organic solvents and water, or a method of adding a PVA-based resin in the form of a dispersion liquid dispersed in the above solvent.

As the timing of addition, the PVA-based resin may be added all at once at the initial stage of polymerization, or may be added separately in the middle of polymerization.

In addition, as an additive during the polymerization, other stabilizers, polymerization aids, polymerization catalysts and the like can be used. As other stabilizers, known stabilizers can be used in combination, and for example, a polymer substance can be used in combination. Examples of the polymer substance include a PVA-based resin other than the PVA-based resin of the present invention. Examples of the PVA-based resin include an unmodified PVA-based resin and the above-mentioned modified PVA-based resin.

Examples of the polymerization aid include various surfactants and inorganic dispersing agents. It is also possible to use the PVA-based resin of the present invention as a polymerization aid.

The polymerization catalyst may be any oil-soluble catalyst. For example, benzoyl peroxide, lauroyl peroxide, diisopropyl peroxydicarbonate, α,α'-azobisisobutyronitrile, α,α'-azobis-2,4-dimethyl-valeronitrile, acetylcyclohexylsulfonyl peroxide or a mixture thereof can be used.

EXAMPLES

Hereinafter, the present invention will be described in more detail with reference to Examples, but the present invention is not limited to the following Examples as long as the gist of the present invention is not exceeded. "Part", "%", etc. are based on weight.

Production Example 1

Into a polymerization can, 100 parts of vinyl acetate, 1.6 parts of acetaldehyde, 4.7 parts of methanol and 0.0092% of acetyl peroxide (APO) with respect to vinyl acetate were charged, and replacement with nitrogen was performed. Thereafter, the polymerization was started by heating at a boiling point, and the polymerization was stopped when the polymerization rate reached 80.0% after a reaction time of about 7 hours. Next, the unpolymerized vinyl acetate was removed, and the obtained polymer was saponified with sodium hydroxide by a conventional method to prepare a saponified slurry (a solvent of methyl acetate/methanol=8/2 (weight ratio)) of a PVA-based resin (average polymerization degree: 630, degree of saponification: 71.7 mol %, carbonyl group amount: 0.20 mol %) having a resin content of 12%. Sodium acetate was added to the saponified slurry such that the amount of sodium acetate after shaking off was 1 wt % with respect to the PVA-based resin, and shaking off was performed.

Next, a 20% methanol solution of magnesium acetate tetrahydrate as a metal compound was added to the PVA-based resin prepared above such that magnesium acetate was 2 wt % with respect to the PVA-based resin. Thereafter, the above product was dried to obtain a PVA-based resin containing 2 wt % (141 µmol/g) of magnesium acetate and 1 wt % (122 µmol/g) of sodium acetate.

Example 1

[Production of PVA-Based Resin (PVA-1) of the Present Invention]

Next, the PVA-based resin obtained by saponification was supplied to a twin-screw extruder and subjected to an extrusion heat treatment under the following extrusion condition A to obtain a polyvinyl alcohol-based resin (PVA-1).

<Extrusion Condition>

The extrusion heat treatment was performed with a twin-screw extruder (TEM-58 manufactured by Toshiba Machine Co., Ltd., L/D=45, Φ=58, rotating in the same direction) to make the resin temperature reach the set temperature.

(Extrusion Condition A)

Temperature setting: C1/C2/C3/C4/C5/C6/C7/C8/C9/C10/H1-50/90/170/180/190/200/205/205/205/205/215° C.

Screw rotation speed: 100 rpm

Resin temperature: 230° C.

The C9 part was vacuum-vented.

<Evaluation 1: Measurement of Ultraviolet Absorbance>

A 0.1% aqueous solution of the PVA-based resin (PVA-1) was prepared. The absorbances of the 0.1% aqueous solution of the PVA-based resin at wavelengths of 215 nm, 280 nm, 320 nm, and 380 nm were measured using an ultraviolet-visible near-infrared spectrophotometer ("V-560" (trade name) manufactured by JASCO Corporation). A sample container (cell) with a thickness of 1 cm was used. In addition, the ratio (Y/X) of the absorbance (Y) at a wavelength of 380 nm to the absorbance (X) at a wavelength of 320 nm was calculated. The results are shown in Table 1.

Example 2

[Production of PVA-Based Resin (PVA-2) of the Present Invention]

The heat treatment was performed in the same manner as in Example 1, except that unlike the production of the PVA-based resin (PVA-1), the extrusion condition was set to the following extrusion condition B.

(Extrusion Condition B)

Temperature setting: C1/C2/C3/C4/C5/C6/C7/C8/C9/C10/H1=50/90/170/180/190/200/205/205/205/205/215° C.

Screw rotation speed: 140 rpm

Resin temperature: 239° C.

The C9 part was vacuum-vented.

With respect to the obtained PVA-based resin (PVA-2), the ultraviolet absorbance and the Y/X value at each wavelength were measured in the same manner as in Example 1. The results are shown in Table 1.

Example 3

[Production of PVA-Based Resin (PVA-3) of the Present Invention]

The heat treatment was performed in the same manner as in Example 1, except that unlike the production of the PVA-based resin (PVA-1), the extrusion condition was set to the following extrusion condition C.

(Extrusion Condition C)

Temperature setting: C1/C2/C3/C4/C5/C6/C7/C8/C9/C10/H1=50/90/170/180/200/210/215/215/215/215/215° C.

Screw rotation speed: 140 rpm

Resin temperature: 241° C.

The C9 part was vacuum-vented.

With respect to the obtained PVA-based resin (PVA-3), the ultraviolet absorbance and the Y/X value at each wavelength were measured in the same manner as in Example 1. The results are shown in Table 1.

Example 4

[Production of PVA-Based Resin (PVA-4) of the Present Invention]

The heat treatment was performed in the same manner as in Example 1, except that unlike the production of the PVA-based resin (PVA-1), the extrusion condition was set to the following extrusion condition D.

(Extrusion Condition D)

Temperature setting: C1/C2/C3/C4/C5/C6/C7/C8/C9/C10/H1/D1/D2/D3=50/200/200/200/220/230/230/230/230/230/230/230/220/230° C.

Screw rotation speed: 310 rpm

Resin temperature: 245° C.

The C9 part was vacuum-vented.

With respect to the obtained PVA-based resin (PVA-4), the ultraviolet absorbance and the Y/X value at each wavelength were measured in the same manner as in Example 1. The results are shown in Table 1.

Example 5

[Production of PVA-Based Resin (PVA-5) of the Present Invention]

The heat treatment was performed in the same manner as in Example 1, except that unlike the production of the PVA-based resin (PVA-1), the extrusion condition was set to the following extrusion condition E.

(Extrusion Condition E)

Temperature setting: C1/C2/C3/C4/C5/C6/C7/C8/C9/C10/H1/D1/D2/D3=50/220/220/220/230/240/240/260/260/260/260/230/230/230° C.

Screw rotation speed: 350 rpm

Resin temperature: 249° C.

The C9 part was vacuum-vented.

With respect to the obtained PVA-based resin (PVA-5), the ultraviolet absorbance and the Y/X value at each wavelength were measured in the same manner as in Example 1. The results are shown in Table 1.

Example 6

[Production of PVA-Based Resin (PVA-6) of the Present Invention]

The heat treatment was performed in the same manner as in Example 1, except that unlike the production of the PVA-based resin (PVA-1), the extrusion condition was set to the following extrusion condition F.

(Extrusion Condition F)

Temperature setting: C1/C2/C3/C4/C5/C6/C7/C5/C9/C10/H1/D1/D2/D3=50/200/200/220/230/230/250/250/250/250/250/250/230/220° C.

Screw rotation speed: 350 rpm

Resin temperature: 248° C.

The C9 part was vacuum-vented.

With respect to the obtained PVA-based resin (PVA-6), the ultraviolet absorbance and the Y/X value at each wavelength were measured in the same manner as in Example 1. The results are shown in Table 1.

Production Example 2

Into a polymerization can, 100 parts of vinyl acetate, 1.2 parts of acetaldehyde, 4.7 parts of methanol and 0.0092% of acetyl peroxide (APO) with respect to vinyl acetate were charged, and replacement with nitrogen was performed. Thereafter, the polymerization was started by heating at a boiling point, and the polymerization was stopped when the polymerization rate reached 91.8% after a reaction time of about 5.7 hours. Next, the unpolymerized vinyl acetate was removed, and the obtained polymer was saponified with sodium hydroxide by a conventional method to prepare a saponified slurry (a solvent of methyl acetate/methanol=8/2 (weight ratio)) of a PVA-based resin (average polymerization degree: 770, degree of saponification: 71.7 mol %, carbonyl group amount: 0.16 mol %) having a resin content of 12%.

Next, a 10% methanol solution of magnesium acetate tetrahydrate as a metal compound was added to the PVA-based resin prepared above at a ratio of 350 g with respect to 1 kg of the PVA-based resin, and the mixture was stirred at 25° C. for 1 hour. Thereafter, the mixture was shaken off with Nutsche to obtain a PVA-based resin containing 3.2 wt % (225 μmol/g) of magnesium acetate.

Comparative Example 1

[Production of PVA-Based Resin (PVA-7)]

Next, the PVA-based resin was extruded and subjected to an extrusion heat treatment in a twin-screw extruder (TEM-58 manufactured by Toshiba Machine Co., Ltd., L/D=45, Φ=58, rotating in the same direction) under the same extrusion conditions A as in Example 1.

(Extrusion Condition A)

Temperature setting: C1/C2/C3/C4/C5/C6/C7/C8/C9/C10/H1=50/90/170/180/190/200/205/205/205/205/215° C.

Screw rotation speed: 100 rpm

Resin temperature: 230° C.

The C9 part was vacuum-vented.

As in Example 1, with respect to the obtained PVA-based resin (PVA-7), the ultraviolet absorbance at each wavelength and the ratio (Y/X) value of the absorbance (Y) at a wavelength of 380 nm to the absorbance (X) at a wavelength of 320 nm were measured. The results are shown in Table 1.

TABLE 1

|  | Absorbance (215 nm) | Absorbance (280 nm) | Absorbance (320 nm) | Absorbance (380 nm) | Absorbance ratio (320/280 nm) | Absorbance ratio (380/320 nm) |
|---|---|---|---|---|---|---|
| Example 1 | 0.44 | 0.46 | 0.44 | 0.06 | 0.96 | 0.14 |
| Example 2 | 0.50 | 0.51 | 0.50 | 0.08 | 0.97 | 0.16 |
| Example 3 | 0.51 | 0.56 | 0.56 | 0.10 | 1.00 | 0.17 |
| Example 4 | 0.37 | 0.44 | 0.36 | 0.04 | 0.82 | 0.10 |
| Example 5 | 0.41 | 0.53 | 0.46 | 0.05 | 0.87 | 0.12 |
| Example 6 | 0.48 | 0.58 | 0.53 | 0.08 | 0.92 | 0.14 |
| Comparative Example 1 | 0.34 | 0.36 | 0.23 | 0.02 | 0.66 | 0.07 |

As suggested from the results in Table 1, in Examples 1 to 6, the value of (Y/X) is larger than that in Comparative Example 1, and the suspension polymerization stability is kept good when used as a dispersing agent for suspension polymerization.

Although the present invention has been described in detail with reference to specific embodiments, it will be apparent to those skilled in the art that various changes and modifications can be made without departing from the spirit and scope of the present invention. This application is based on a Japanese Patent Application (Japanese Patent Application No. 2019-043117) filed Mar. 8, 2019, the contents of which are incorporated herein by reference.

INDUSTRIAL APPLICABILITY

Because of having a large proportion of double bonds derived from the [—CO—(CH=CH)$_4$—] structure, the PVA-based resin of the present invention is excellent in polymerization stability during polymerization when used as various dispersing agents. The PVA-based resin of the present invention is particularly useful as a dispersing agent for suspension polymerization of vinyl chloride-based monomers.

The invention claimed is:

1. A polyvinyl alcohol-based resin, wherein when the polyvinyl alcohol-based resin is made into a 0.1 wt % aqueous solution, an absorbance (X) at a wavelength of 320 nm in an ultraviolet absorption spectrum thereof is 0.3 or more, and a ratio (Y/X) of an absorbance (Y) at a wavelength of 380 nm to the absorbance (X) at a wavelength of 320 nm is 0.09 or more.

2. The polyvinyl alcohol-based resin according to claim 1, wherein the polyvinyl alcohol-based resin has a degree of saponification of 60 mol % or more.

3. A dispersing agent comprising: the polyvinyl alcohol-based resin according to claim 1.

4. A dispersing agent for suspension polymerization comprising: the polyvinyl alcohol-based resin according to claim 1.

* * * * *